United States Patent
Woodke, III

[15] 3,649,049
[45] Mar. 14, 1972

[54] THREE POINT TOW BAR

[72] Inventor: Charles L. Woodke, III, 7241 South Tacoma Way, Tacoma, Wash. 98409

[22] Filed: Apr. 6, 1970

[21] Appl. No.: 25,872

[52] U.S. Cl. .............................. 280/502, 280/491, 280/457
[51] Int. Cl. ....................................... B60d 1/14, B60d 1/16
[58] Field of Search .............. 280/505, 481, 493, 491 E, 502

[56] References Cited

UNITED STATES PATENTS

| | | | |
|---|---|---|---|
| 3,072,419 | 1/1963 | Safford | 280/502 X |
| 3,302,958 | 2/1967 | Fawcett et al | 280/502 X |
| 3,119,631 | 1/1964 | Wanamaker | 280/502 X |
| 3,472,529 | 10/1969 | Gal | 280/502 |
| 2,840,392 | 6/1958 | Miles et al. | 280/493 |

Primary Examiner—Leo Friaglia
Attorney—Graybeal, Cole & Barnard

[57] ABSTRACT

A pair of elongated arms diverge apart as they extend rearwardly from separate points of connection to a coupler head. Bumper pads at the rear ends of the arms contact the front bumper of a vehicle to be towed. The coupler head is secured to a trailer hitch on a towing vehicle. Two chain side parts are wrapped around and hooked onto two laterally spaced bumper brackets at the front of the rear vehicle. These chain side parts converge together as they extend forwardly. At the coupler head the two chain side parts are connected to a single draw bolt which is shortenable for the purpose of removing slack from the two chain side parts.

10 Claims, 5 Drawing Figures

Patented March 14, 1972
3,649,049
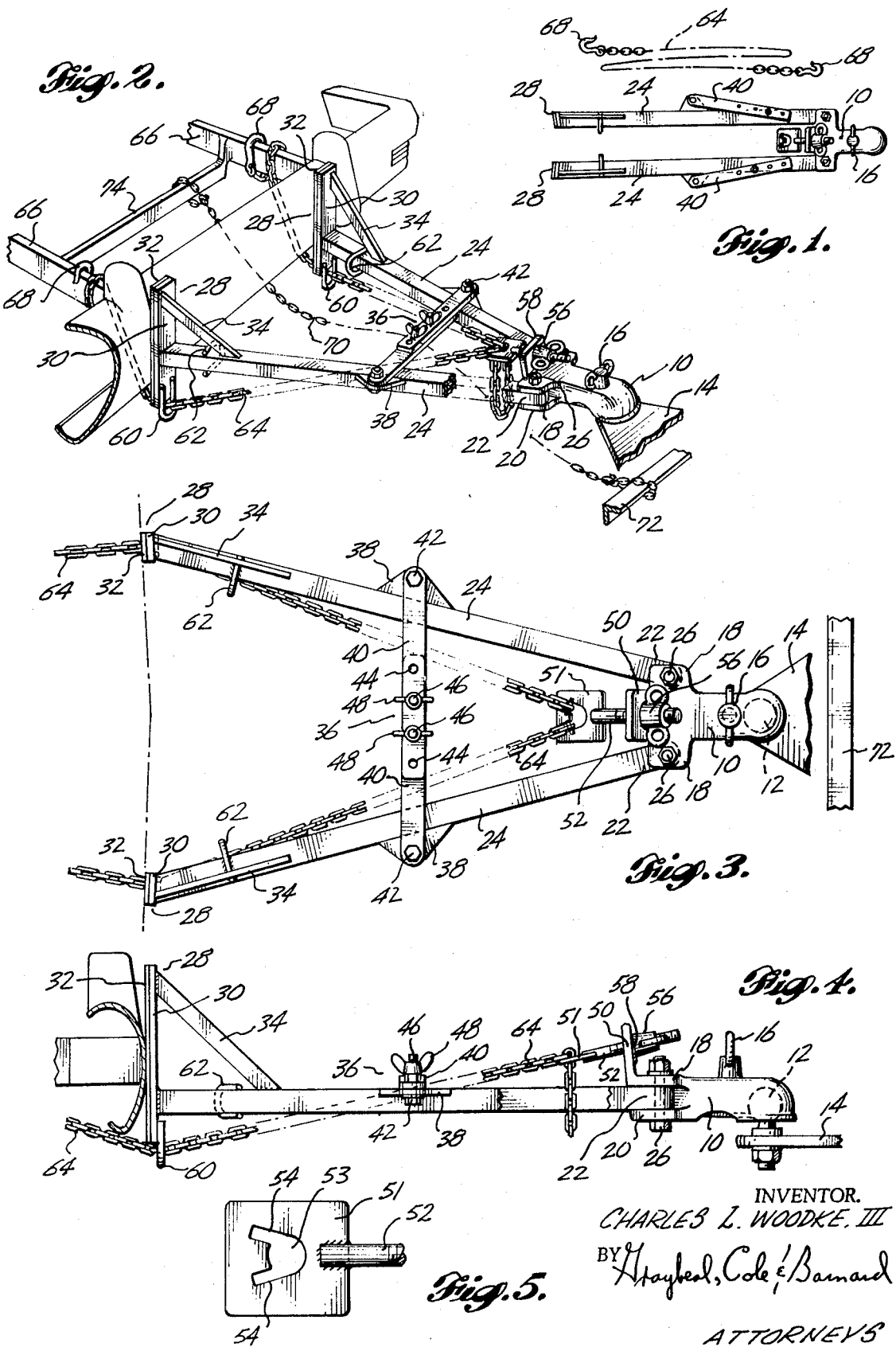
INVENTOR.
CHARLES L. WOODKE, III
BY Graybeal, Cole & Barnard
ATTORNEYS

THREE POINT TOW BAR

BACKGROUND OF THE INVENTION

1. Field of the Invention

This invention relates to tow bars interconnectible between a towing vehicle and a towed vehicle, for the purpose of maintaining proper spacing between the two vehicles, and including a chain or the like for connecting the two vehicles together and carrying the draft forces.

2. Description of the Prior Art

There are several styles of tow bars in use today. One style includes a coupler head securable to a ball hitch on a towing vehicle, a pair of rearwardly divergent arms which extend rearwardly from points of connection with the coupler head towards laterally space positions of contact with locations on the front bumper of the vehicle being towed, and a pair of draft chains interconnected between midportions of the side arms and forward frame portions of the towed vehicle.

A disadvantage of this style of tow bar is that it places a bending force on the two side arms and includes the side arms in the draft force system between the towing and towed vehicles, making necessary the use of an elaborate and expensive to manufacture brace assembly between the two side arms. A further disadvantage is that it requires a draw bolt assembly on each side arm, adding additional cost to the tow bar.

SUMMARY OF THE INVENTION

The present invention relates to a tow bar of the aforementioned type having a pair of rearwardly divergent side arms together forming a spacer between the towing and towed vehicles. However, unlike the prior design, the tow bar of the present invention includes a draft chain system which is directly interconnected between the coupler head and frame portions of the vehicle being towed, to establish a three point force system carrying the draft forces, which force system does not include, and does not directly load, the two divergent side arms.

According to the present invention, a single draw bolt is carried by the coupler head. The two ends of a single continuous chain, or the rear end portions of a pair of separate chains, are firmly attached to laterally space apart forward frame portions of the vehicle being towed. The chain parts are brought forwardly and together to the coupler head and are both secured to the draw bolt, and the draw bolt is used for removing unwanted slack from both such parts. During towing the draft forces are transmitted from the vehicle under tow directly to the coupler head, through these chain parts, and from the coupler head forwardly to the towing vehicle via its towing hitch.

Other advantages of the tow bar of the present invention include a simplicity of construction, making the tow bar relatively inexpensive to manufacture; a simplicity in operation, attributable to a minimum of elements requiring adjustments or other manipulation; and an overall construction combining a pleasing appearance with strength and durability.

These and other features and advantages of the tow bar will be apparent from the detailed description which follows in which reference is made to the accompanying drawing.

BRIEF DESCRIPTION OF THE DRAWING

FIG. 1 is a top plan view of the tow bar in a folded condition for storage, and showing a one piece towing chain usable with the tow bar located next to the tow bar;

FIG. 2 is an isometric view of the tow bar installed between a towing vehicle and a towed vehicle, with some parts fragmented and other parts broken away for clarity of illustration;

FIG. 3 is a top plan view of the tow bar assembly of FIG. 2;

FIG. 4 is a side elevational view of the tow bar assembly of FIGS. 2 and 3; and

FIG. 5 is a plan view of a double slot chain hook.

DESCRIPTION OF THE PREFERRED EMBODIMENT

The illustrated embodiment comprises a coupler head 10 which is preferably of one piece cast construction. Head 10 includes a forward portion for engaging the hitch ball 12 of a trailer hitch 14 secured to the towing vehicle (not shown). A wing-type lock nut 16 is provided for operating a conventional mechanism (not shown) for loosely securing the coupler head 10 to the hitch ball 12, in a manner which is known per se.

Upper and lower hinge cheeks 18, 20 make up the rear corners of the head 10. These cheeks 18, 20 are spaced vertically apart to form spaces sized to loosely receive the forward end portions 22 of a pair of elongated side arms 24. Vertical pivot pins 26 extend through aligned apertures formed in the end portions 22, and the cheeks 18, 20, to pivotally connect the side arms 24 to the coupler head 10.

In the illustrated embodiment the side arms 24 are shown to be constructed from rectangular tubular stock. A bumper pad 28 is secured to the rear end of each side arm 24. Each bumper pad 28 comprises a generally upright metal member 30 backed by an elastomeric (e.g., rubber) pad 32. An angle brace 34 is interconnected between the upper end of each upright 30 and a relatively closely adjacent point on the associated side arm 24.

An adjustable cross brace 36 is provided generally midway between the front and rear ends of the tow bar. Each arm has welded to it a laterally outwardly projecting hinge plate 38, the upper surface of which is generally coplanar with the upper surface of the side arm 24. The cross brace is composed of a pair of elongated flat bar parts 40. Pivot pins 42 extend through aligned apertures in the plates 38 and the outer end portions of the parts 40. The inner end portions of the parts 40 lap each other and each includes a plurality of equally spaced bolt receiving openings 44. Preparatory to use, the side arms 24 of the tow bar are spaced apart the desired amount and then the nearest set of openings 44 are aligned. Holding bolts 46 are inserted through the aligned openings 44 and wing nuts 48 or the like are installed.

In the preferred embodiment, an upstanding support wall 50 is formed integral with the coupler head 10 at a location between the two pivot pins 26. A generally fore-and-aft opening is formed in wall 50 for receiving the shank portion of a draw bolt 52. A slot type chain hook member 41 is provided at the rear end of the draw bolt 52. The forward end of the draw bolt 52 is threaded to receive an adjustment nut 56, which may also be a wing nut. The chain is free to move through the opening 53 but is engageable by insertion of links thereof in the slots 54.

As best shown by FIG. 4, the draw bolt opening in wall 50 is formed such that its axis slopes downwardly in the rearward direction and upwardly in the forward direction. A sloping surface 58 is provided on the front side of wall 50 around the opening, to provide a seat for the nut 56, which seat is generally perpendicular to the axis of the bolt 52.

A chain guide 60 is located immediately below the lower end of each bumper pad 28. As illustrated, the guides 60 may be in the form of U-shaped members, the legs of which are welded to the uprights 30. Similar chain guides 62 may be secured to the side arms 24 at a location spaced a short distance forwardly of the uprights 30.

The method of installation will now be described.

The tow bar's arms 24 are spread apart (e.g., approximately 30 inches) to fit a particular bumper, a set of the openings 44 in the two cross brace parts 40 are aligned, and the holding bolts 46 and their nuts 48 are installed. The bumper pads 32 are placed against the vehicle to be towed. The towing vehicle is backed into place and the coupler head 10 is connected to its hitch ball 12. The rear end portions of the tow chain 64 are passed under the forward bumper of the rear vehicle, are wrapped around the bumper support brackets 66, and the rear end hook 68 are hooked over the bumper brackets 66. Next, slack is pulled out of the two side parts of the chain 64 and the forward portion of the chain 64 is by hand drawn towards the draw bolt 52. At this stage the chain 64 extends through one of the sets of guides 60, 62 and the adjustment nut 56 is relatively forwardly on the draw bolt 52. The chain 64 is held taut and the closest available link of the chain 64 on each side of the draw bolt 52 is dropped into the slot 54 at such side. The bight portion of the chain 64 between these links is allowed to merely hang slack below the draw bolt 52. Next the adjustment nut 56 is tightened to draw any remaining slack out of the chain 64.

A second safety chain 70 is interconnected between frame parts 72 and 74 of the towing and towed vehicles, respectively.

As can be readily appreciated by a person readily skilled in the art, the tow bar of this invention provides a nearly true three point draft force system. The drag force of the vehicle being towed is transmitted by both the chain side parts directly to the coupler head 10. The chain parts are not tied to the side arms 24 so as to impose bending forces on them, as is characteristic of the closest known tow bar in use at this time.

The hitch 14 on the towing vehicle may be either an attachment or a permanent fixture. Two separate chains may be substituted for the single chain 64. The hook portion of draw bolt 52 may take a different form than what is illustrated. For example, it may comprise a plate having a pair of separate keyhole openings therein, with the large portions of such openings sized to pass the chain and the slot portion being sized to accommodate only the flat width dimension of a single link of the chain. Or, it may comprise a pair of curved hook tines insertable into the openings of a pair of chain links.

From the foregoing, various other features, advantages, objectives, modifications, adaptations and rearrangements of the tow bar assemblage and components thereof will be apparent to those skilled in the art within the scope of the following claims.

What is claimed is:

1. A tow bar comprising:
a coupler head securable to a towing vehicle;
a spacer frame having a forward end portion connected to said coupler head and a rear end portion positionable against the bumper of a vehicle to be towed;
towing line means including two side parts having rear end portions for connection to two laterally spaced forward frame portions of the vehicle to be towed; and
tensioning means on said coupler head for engaging forward portions of both side parts of the line means, said tensioning means being adjustable for the purpose of pulling slack from said side parts, with said side parts in use transmitting the draft forces in the towing line means directly from the vehicle being towed forwardly to the coupler head.

2. A tow bar according to claim 1, wherein the coupler head includes an upstanding flange having a generally fore-and-aft extending bolt receiving opening therein, and said tensioning means comprises a draw bolt extending through said opening and having means at its rear end connectable to the side parts of the towing line means, and means for moving said bolt forwardly for the purpose of pulling slack from said side parts.

3. A tow bar according to claim 2, wherein said tow line means is made from interlocking link chain and the means connectable to the side parts comprises a member including a pair of slots, each engageable with a link of the chain.

4. A tow bar according to claim 2, wherein the coupler head includes an upstanding flange located generally between the connection points of the two side arms to the coupler head, and the draw bolt opening is formed in said flange.

5. A tow bar according to claim 4, wherein said opening is bounded at its forward end by an adjustment nut seat on the flange which leans rearwardly from vertical, so that in use the two side parts of the chain may extend rearwardly and downwardly from the draw bolt, and under the front bumper of the vehicle in tow.

6. A tow bar according to claim 2, wherein the towing line means is an oval link chain and the hook portion of the draw bolt comprises a member including a pair of slots, each sized to receive a link of the towing chain means.

7. A tow bar comprising:
a coupler head securable to a hitch on a towing vehicle, said coupler head including a draw bolt support provided with a generally fore-and-aft directed opening;
a draw bolt extending through said opening and having a rearwardly directed hook portion and a forwardly directed threaded portion, and an adjustment nut on said threaded portion;
a spacer frame comprising a pair of side arms, each having a forward end connected to said coupler head and a towed vehicle bumper contacting portion at its rear end; and
towing chain means for connection to the hook portion of said draw bolt, and including two side parts extendible directly rearwardly from said hook portion for connection to two laterally spaced forward frame portions of the towed vehicle.

8. A tow bar according to claim 7, wherein the two side arms are connected to the coupler head by pivot pins which in use are generally vertically oriented, so that the side arms can be moved together for stowage and dihedrally apart for use in towing a vehicle, and a cross brace interconnectible between midportions of the side arms, for holding them in a spread position.

9. A tow bar according to claim 8, wherein the cross brace comprises a pair of elongated members, each having an outer end portion pivotally connected to its side arm and an inner end portion which laps the inner end portion of the other such member, and the inner end portions of the members each include adjustment bolt opening means alignable in a plurality of different positions with the adjustment bolt opening means in the other member, so that the spread of the side arms can be adjusted, and lock bolt assemblies insertable through the openings and tightenable to secure the cross brace parts together.

10. A tow bar according to claim 9, wherein each side arm has a bracket plate extending laterally outwardly therefrom, and the means pivotally connecting the outer ends of the brace parts each comprises a pivot pin which extends through both the outer end portion of the cross brace part and the bracket.

* * * * *